UNITED STATES PATENT OFFICE.

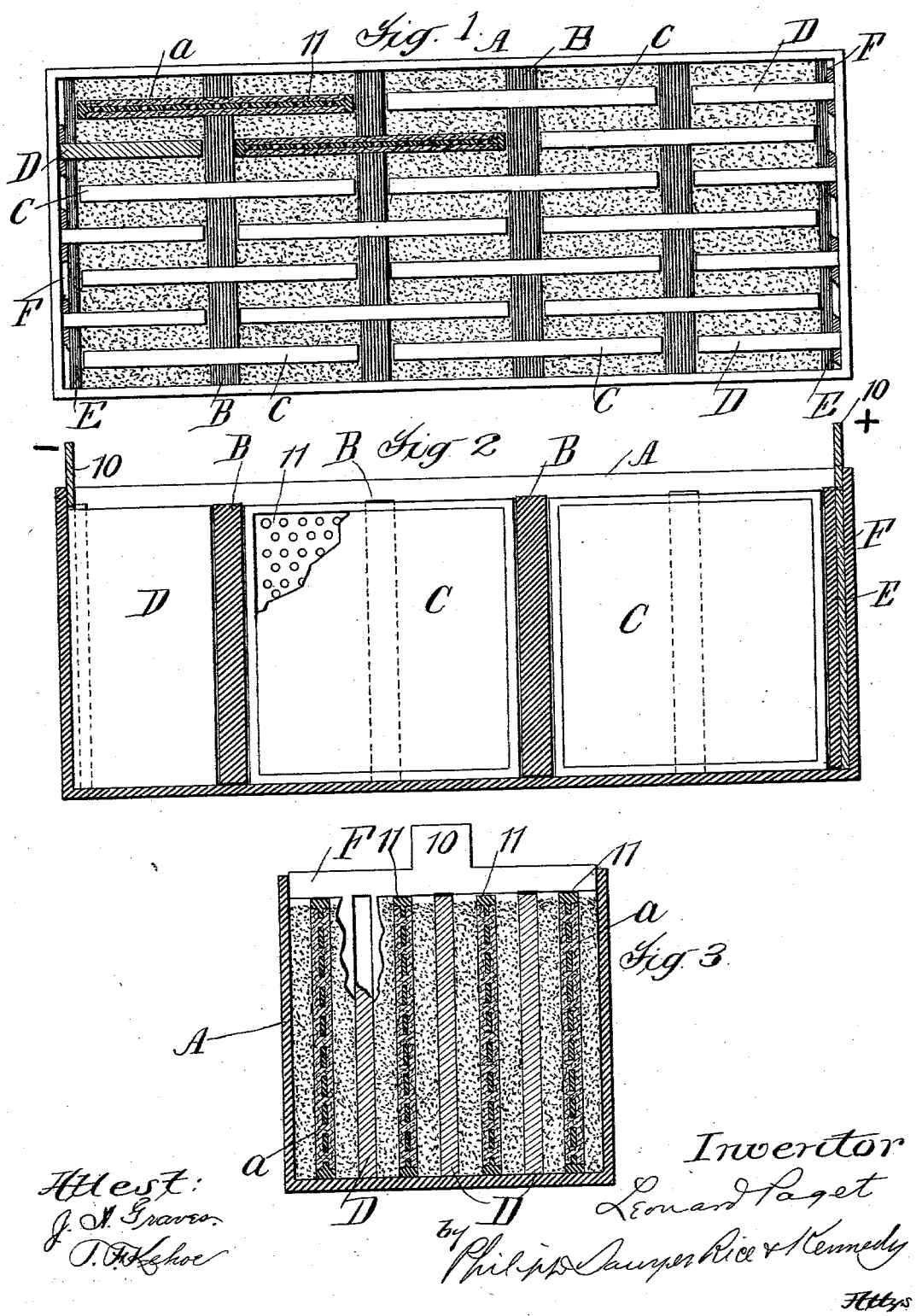

LEONARD PAGET, OF NEW YORK, N. Y., ASSIGNOR TO CHARLES COSTER, OF NEW YORK, N. Y.

STORAGE BATTERY.

SPECIFICATION forming part of Letters Patent No. 715,413, dated December 9, 1902.

Application filed August 28, 1901. Serial No. 73,535. (No model.)

*To all whom it may concern:*

Be it known that I, LEONARD PAGET, a citizen of the United States, residing at New York, county of New York, and State of New York, have invented certain new and useful Improvements in Storage Batteries, fully described and represented in the following specification and the accompanying drawings, forming a part of the same.

This invention relates to multiple-cell storage batteries—that is, storage batteries formed of two or more cells—the especial object of the invention being to provide a storage battery of large capacity, but of small size and weight in relation to its electrical output, and which shall be simple, cheap, and durable under all conditions of use.

In the accompanying drawings, forming a part of this specification, I have shown a multiple-cell battery of five cells embodying all the features of the invention in their preferred form, and this construction will now be described in detail, and the features forming the invention then specifically pointed out in the claims.

In the drawings, Figure 1 is a plan view of my improved battery with some of the plates shown in section for purpose of illustration. Fig. 2 is a longitudinal vertical section with one of the plates partly broken away to show the construction. Fig. 3 is a vertical cross-section, partly broken away.

Referring now to the drawings, A is the cell-casing or containing vessel, which may be of any suitable form and non-conducting material and is divided into five cells by the insulating-partitions B, of hard rubber or similar material. The storage-battery plates or electrodes are arranged edgewise of the battery, and the intermediate electrodes C extend through the partitions B, so that these intermediate electrodes are bipolar electrodes with the ends of the plates forming the electrodes of opposite polarities. The end electrodes D also extend through insulating-plates E at the ends of the battery and outside these insulating-plates E connect with the conducting-plates F, extending across the ends of the battery and shown as having the usual conducting-lugs 10 for the battery-connectors. The end electrodes D may be of any convenient form or material, but are shown as formed of plates, which may be lead plates faced with active material or material adapted to become active, such as lead oxid, or which may be electrically formed by the Planté process. The intermediate electrodes C also may be of any character and construction suitable to form bipolar storage-battery plates, but are shown as formed of a supporting non-conducting frame 11, having a perforated web, which frames are preferably of an elastic non-conducting material, such as well-vulcanized soft rubber, to permit the expansion of the active material and hold it properly during contraction. These frames are filled with the active material $a$, which may be of any suitable character, such as oxid of lead or finely-divided lead compressed to the desired density. Each of the compartments or cells of the battery is filled between the plates to a suitable level with the electrolyte, which is preferably contained or held by an absorbent material G, as shown. Any suitable electrolyte may be used—for instance, a sulfuric-acid solution—and the absorbent material may be of any suitable character, many such absorbent materials being now known and in use—such as kieselguhr, pumice, and similar materials.

The battery is charged by being connected in circuit with a source of electric current, preferably of about two and a half volts electromotive force for each cell, although this may be varied until the plates are formed and charged. It will be understood that the battery is connected with the source of electric current by connecting the positive and negative end electrodes of the battery to the corresponding conductors of the charging-current and that the end electrodes and intermediate electrodes are connected in electrical series through the electrolyte and the lead oxid or other material constituting the intermediate electrodes and supported by the frames 11, so that this active material forms the sole conducting connections between the opposite ends of these electrodes and between the successive cells. Each of the intermediate plates C is thus charged positively on the portion or end at one side of the partition B and negatively on the other portion or end, lead oxid, if this be used in filling the frame being converted into peroxid of lead on one side of the partition and reduced on the opposite side of the partition, so as to form a bipolar electrode. On the end electrodes, of course, lead peroxid is formed on one of them and electrically-reduced lead on the other.

It will be seen that in my battery the connection is directly through the partitions from one cell to the next and between the positive and negative portions of the bipolar electrodes. This is very important, as it avoids all travel of the current up and down in passing from one cell to the other. The connection also is from a single positive to a single negative in successive cells, so that there is no parallel connection of plates, thus preventing discharge of a more highly formed plate into a less well formed plate, as frequently occurs in unipolar storage batteries. There is no possibility of local action between plates of different degrees of formation, so that an extremely-low internal resistance of the battery is secured. As compared with other storage batteries having bipolar intermediate plates there is a very large increase of surface relatively to the size of the battery, and great strength of the plates is secured by the edgewise arrangement, there being no tendency to buckling, because the ends of the plates are free.

It will be understood that changes may be made in the form and arrangement of parts without departing from the invention and that I am not to be limited to any special character or construction of plates or electrodes in forming the battery, the broader features of the invention consisting in the general arrangement of the battery as claimed.

What I claim is—

1. A multiple-cell storage battery having battery-plates extending edgewise from one cell to another with the sole conducting connection between the cells formed by the active material.

2. A multiple-cell storage battery having partitions between the cells and battery-plates extending edgewise through the partitions.

3. A multiple-cell storage battery having partitions between the cells and battery-plates extending edgewise through the partitions with the sole conducting connection through the partitions between the cells formed by the active material.

4. A multiple-cell storage battery having partitions between the cells and bipolar electrodes extending through the partitions and consisting of non-conducting frames filled with active material forming the sole conducting connection between the cells.

In testimony whereof I have hereunto set my hand in the presence of two subscribing witnesses.

LEONARD PAGET.

Witnesses:
C. J. SAWYER,
A. A. V. BOURKE.